(12) United States Patent
Suraparaju

(10) Patent No.: US 12,271,463 B2
(45) Date of Patent: Apr. 8, 2025

(54) METHOD AND SYSTEM FOR SECURE CLOUD ACCESS VIA PASSWORD-LESS SINGLE SIGN-ON (SSO) FOR NATIVE MARKETPLACE APPLICATIONS ON MULTIFUNCTION PRINTERS

(71) Applicant: Konica Minolta Business Solutions U.S.A., Inc., Ramsey, NJ (US)

(72) Inventor: Rahul Suraparaju, Fremont, CA (US)

(73) Assignee: Konica Minolta Business Solutions U.S.A., Inc., Ramsey, NJ (US)

( * ) Notice: Subject to any disclaimer, the term of this patent is extended or adjusted under 35 U.S.C. 154(b) by 308 days.

(21) Appl. No.: 17/548,455

(22) Filed: Dec. 10, 2021

(65) Prior Publication Data

US 2023/0185893 A1 Jun. 15, 2023

(51) Int. Cl.
*G06F 21/41* (2013.01)
*H04L 9/40* (2022.01)

(52) U.S. Cl.
CPC ............ *G06F 21/41* (2013.01); *H04L 63/083* (2013.01)

(58) Field of Classification Search
CPC ............................... G06F 21/41; H04L 63/083
See application file for complete search history.

(56) References Cited

U.S. PATENT DOCUMENTS

| | | | | |
|---|---|---|---|---|
| 9,001,370 | B1 * | 4/2015 | Nuggehalli | G06F 21/31 358/1.15 |
| 11,140,146 | B2 | 10/2021 | Suraparaju | |
| 2014/0098392 | A1 * | 4/2014 | Tan | G06K 15/4005 358/1.13 |
| 2017/0244555 | A1 * | 8/2017 | Beiter | H04L 9/3226 |
| 2018/0333105 | A1 * | 11/2018 | Hayat | G06F 18/2415 |
| 2019/0052772 | A1 * | 2/2019 | Yamada | H04N 1/00832 |
| 2020/0106766 | A1 * | 4/2020 | Suraparaju | H04L 9/3226 |
| 2020/0213297 | A1 * | 7/2020 | Suraparaju | H04L 63/0892 |
| 2020/0310709 | A1 * | 10/2020 | Suraparaju | G06F 16/275 |
| 2021/0081154 | A1 * | 3/2021 | Yasuda | G06F 21/31 |
| 2021/0099874 | A1 * | 4/2021 | Suraparaju | H04W 12/0471 |
| 2021/0306318 | A1 * | 9/2021 | Yokoyama | G06F 9/451 |
| 2021/0336950 | A1 * | 10/2021 | Miyamoto | H04L 9/3271 |
| 2022/0070310 | A1 * | 3/2022 | Tomioka | H04L 63/08 |
| 2022/0107996 | A1 * | 4/2022 | Otsu | G06F 21/604 |
| 2022/0159145 | A1 * | 5/2022 | Nomoto | G06F 3/1288 |

* cited by examiner

*Primary Examiner* — James R Turchen
(74) *Attorney, Agent, or Firm* — Buchanan Ingersoll & Rooney PC

(57) ABSTRACT

A method, a non-transitory computer readable medium, and multifunction printer for accessing a resource hosted on one or more cloud servers from a cloud ready application on the multifunction printer are disclosed. The method includes receiving, on the multifunction printer, a redirection request from an authentication server for an authentication token for a pre-authenticated user in response to a request for the resource hosted on the one or more cloud servers from the multifunction printer; sending, from the multifunction printer, the authentication token for the pre-authenticated user to the authentication server in response to the redirection request form the authentication server; receiving, on the multifunction printer, an authentication assertion from the authentication server; sending, by the multifunction printer, the authentication assertion to the one or more cloud servers; and accessing, by the cloud ready application on the multifunction printer, the resource hosted on the one or more cloud servers.

19 Claims, 8 Drawing Sheets

METHOD AND SYSTEM FOR SECURE CLOUD ACCESS VIA PASSWORD-LESS SINGLE SIGN-ON (SSO) FOR NATIVE MARKETPLACE APPLICATIONS ON MULTIFUNCTION PRINTERS

FIELD OF THE DISCLOSURE

The present disclosure generally relates to computer networking systems and methods for secure cloud access via password-less single sign-on (SSO) for native marketplace applications on multifunction printers (MFP).

BACKGROUND

Currently, vendors of multifunction printers (MFPs) generally offer Cloud connector applications on their multifunction printer (MFP) panel to get the users to avail an application experience, for example, for access to Google Cloud Print (GCP). This access control requires users to provide username and password. Some MFP vendors have SAML based (password-less) SSO on the MFP, however, the access by the users is on a browser, rather than, for example, a sandboxed purpose-built native application.

The experience of users to applications hosted in the cloud by current MFP vendors generally falls into a couple of categories that can include relatively non-secure access with a relatively good user experience, or relatively secure access with poor user experience. For example, password-based user authentication by marketplace applications is not relatively secure, however, the marketplace applications offer a relatively better user experience than a browser-based application, as marketplace applications are built to present the content in an intuitive and efficient way. Alternatively, the access to cloud hosted applications can be relatively secure with password-less authentication through a browser installed on the MFP. However, the user experience can be rather poor since cloud content on a browser can be inferior to the user experience based on a native application that is specifically designed for an MFP (i.e., marketplace applications that are installed on MFP). For example, browser based-applications can be inferior in terms of content presentation, layout, and intuitiveness. For example, since most graphical user interfaces or screens on MFP's have a relatively smaller size (i.e., real estate) than that, for example, of personal computer (PC).

Security Assertion Markup Language (SAML) is an XML standard for exchanging single sign-on information between an SAML Federation Identity Provider (IdP) who asserts the user identity and a SAML Federation Service Provider (SP) who consumes the user identity information.

Single sign-on (SSO) is an authentication process that allows a user to access multiple applications with one set of login credentials. Single sign-on, for example, is a common procedure in enterprises, where a client accesses multiple resources connected to a local area network (LAN).

SUMMARY

In consideration of the above issues, a method and system is disclosed, which provides a unique mechanism to avoid the current technical limitations faced by MFP vendors, which include failing to achieve both a password-less based security and a relatively good user experience.

In accordance with one aspect, a method is disclosed for accessing a resource hosted on one or more cloud servers from a cloud ready application on a multifunction printer, the method comprising: receiving, on the multifunction printer, a redirection request from an authentication server for an authentication token for a pre-authenticated user in response to a request for the resource hosted on the one or more cloud servers from the multifunction printer; sending, from the multifunction printer, the authentication token for the pre-authenticated user to the authentication server in response to the redirection request form the authentication server; receiving, on the multifunction printer, an authentication assertion from the authentication server; sending, by the multifunction printer, the authentication assertion to the one or more cloud servers; and accessing, by the cloud ready application on the multifunction printer, the resource hosted on the one or more cloud servers.

In accordance with another aspect, a non-transitory computer readable medium (CRM) storing computer program code executed by a computer processor that performs a process is disclosed for accessing a resource hosted on one or more cloud servers from a cloud ready application on a multifunction printer, the process comprising: receiving, on the multifunction printer, a redirection request from an authentication server for an authentication token for a pre-authenticated user in response to a request for the resource hosted on the one or more cloud servers from the multifunction printer; sending, from the multifunction printer, the authentication token for the pre-authenticated user to the authentication server in response to the redirection request form the authentication server; receiving, on the multifunction printer, an authentication assertion from the authentication server; sending, by the multifunction printer, the authentication assertion to the one or more cloud servers; and accessing, by the cloud ready application on the multifunction printer, the resource hosted on the one or more cloud servers.

In accordance with a further aspect, a multifunction printer is disclosed for accessing a resource hosted on one or more cloud servers from a cloud ready application on the multifunction printer, the multifunction printer comprising: a memory; a graphical user interface; and a processor configured to: receive, a redirection request from an authentication server for an authentication token for a pre-authenticated user in response to a request for the resource hosted on the one or more cloud servers from the multifunction printer, the pre-authenticated user being authenticated via a single sign-on (SSO) method; send the authentication token for the pre-authenticated user to the authentication server in response to the redirection request form the authentication server; receive an authentication assertion from the authentication server; send the authentication assertion to the one or more cloud servers; and access the resource hosted on the one or more cloud servers from the cloud ready application on the multifunction printer.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
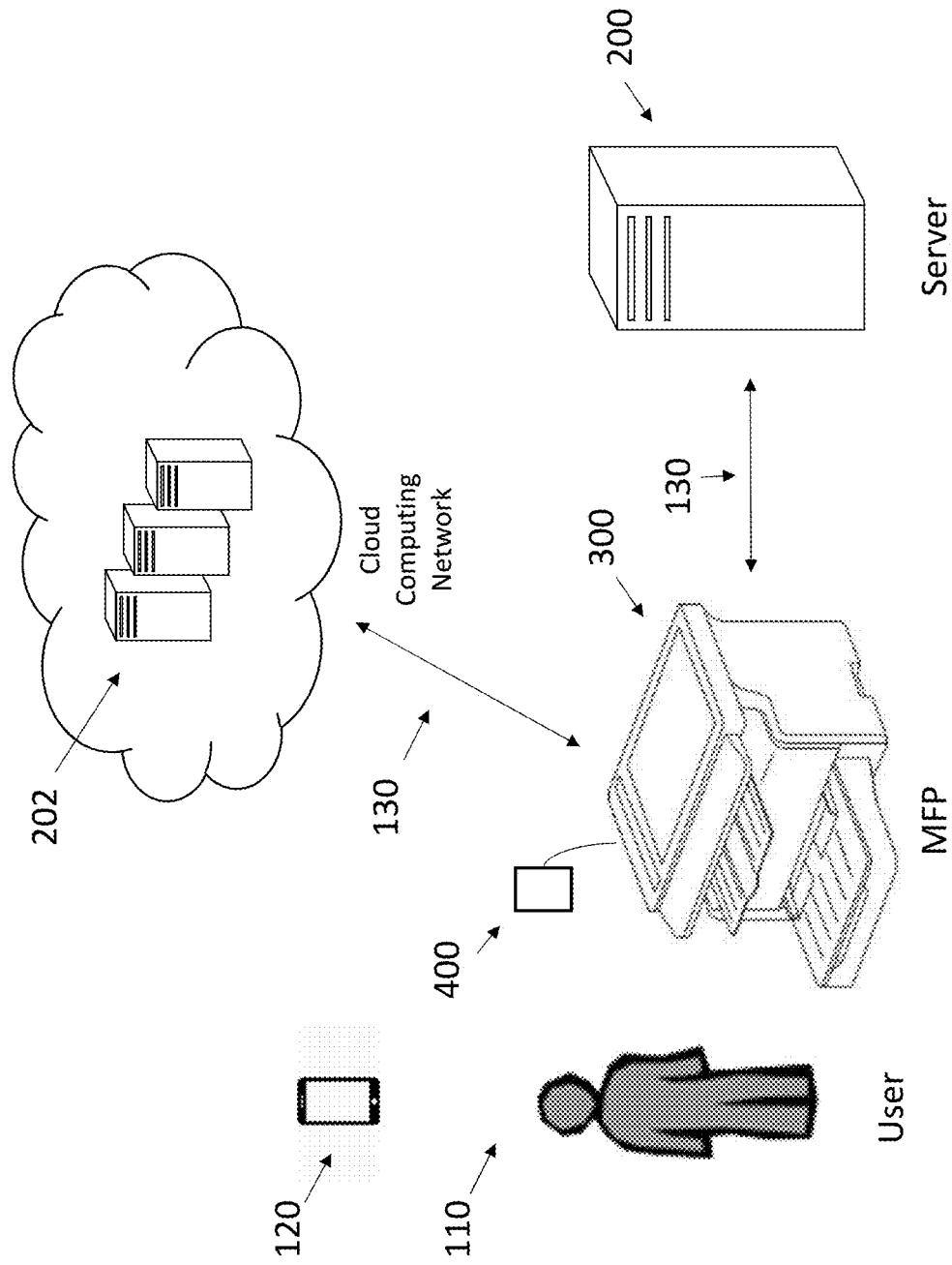
FIG. 1 is an illustration of a system for secure cloud access via password-less single sign-on (SSO) for native marketplace applications on multifunction printers (MFP) in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a system 100 for secure cloud access via password-less single sign-on (SSO) for native marketplace applications on multifunction printers (MFP) in accordance with an exemplary embodiment. As shown in FIG. 1, the system 100 can includes one or more servers 200, 202, which can be configured to host, for example, a DNS server, a SAML IdP, and a Cloud server as disclosed for secure cloud access via password-less single sign-on (SSO) for native marketplace applications on multifunction printers (MFP). In accordance with an embodiment, applications can be marketplace connector sand-box apps, for example, Google Cloud Print, SharePoint, OneDrive, Box, Gmail, etc. The system 100 can also include a user 110, a client 120, a multifunction printer 300, and an authentication device 400. In accordance with an exemplary embodiment, the user 110 can be authenticated via the authentication device 400, which can be, for example, an external biometric device before accessing the multifunction printer 300. The system can also include the client 120, for example, a mobile client configured to send resources to the multifunction printer 300 and/or as an authentication device, for example, for two-factor authentication. For example, the client 120 can be used to receive an input code, for example, a series of numbers upon authentication of the user 110 with the authentication device 400.

The client 120, the one or more servers 200, 202, the multifunction printer 300, and the authentication device 400, can be configured to communicate with one another via a communication network or network 130. The communication network or network 130 can be a public telecommunication line and/or a network (for example, LAN or WAN). Examples of the communication network 130 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission. In accordance with an exemplary embodiment, the multifunction printer 300 and the authentication device 400 can be connected with a wire or wireless.

Figure 2:
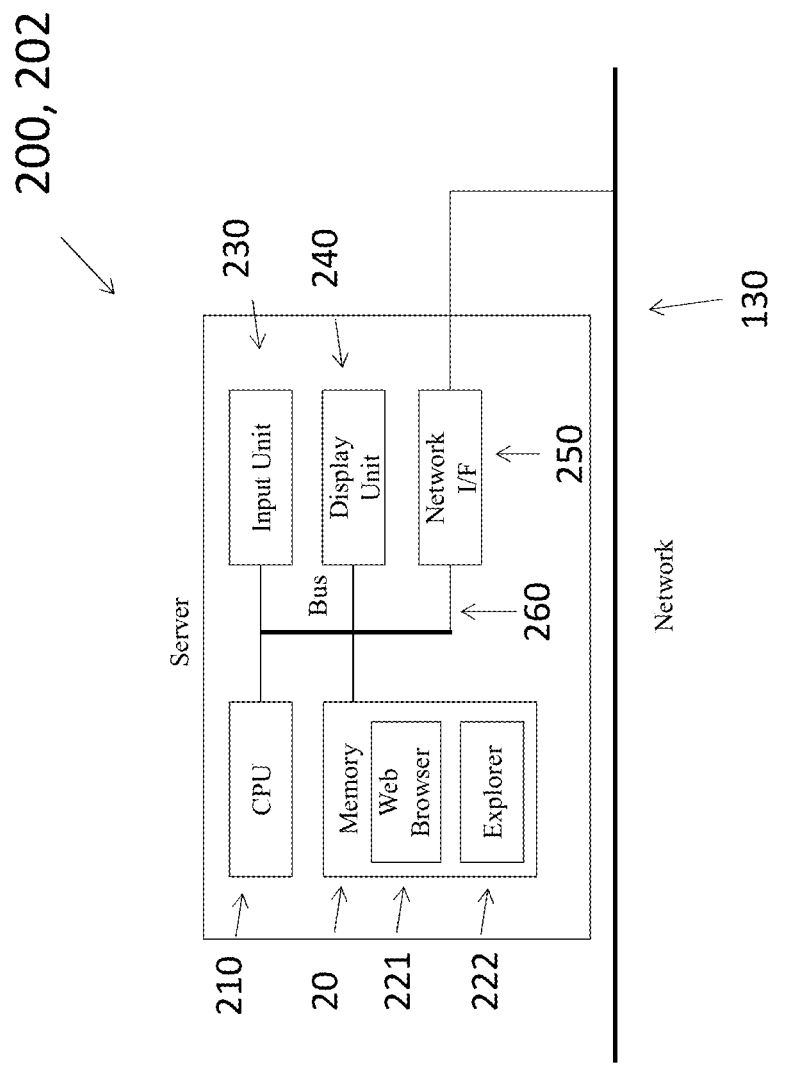
FIG. 2 is an illustration of a server for secure cloud access via password-less single sign-on (SSO) for native marketplace applications on multifunction printers (MFP) in accordance with an exemplary embodiment.

FIG. 2 is an illustration of a server 200, 202, in accordance with an exemplary embodiment. As shown in FIG. 2, the server 200, 202 can be configured to provide applications and/or services to the multifunction printer 300 and the authentication device 400 via the multifunction printer 300. In addition, for example, one or more of the servers 200, 202, for example, can be a plurality of servers 202 deployed in the cloud providing cloud infrastructure and cloud storage. The server 200, 202 can include a processor or central processing unit (CPU) 210, and one or more memories 220 for storing software programs and data. The processor or CPU 220 is configured to carry out the instructions of a computer program, which operates and/or controls at least a portion of the functionality of the server 200, 202. The server 200, 202 can also include an input unit 230, a display unit or graphical user interface (GUI) 240, and a network interface (I/F) 250, which is connected to a communication network (or network) 130. A bus 260 can connect the various components 210, 220, 230, 240, and 250 within the server 200, 202. The server 200, 202 can include an operating system (OS), which manages the computer hardware and provides common services for efficient execution of various software programs as disclosed herein.

Figure 3:
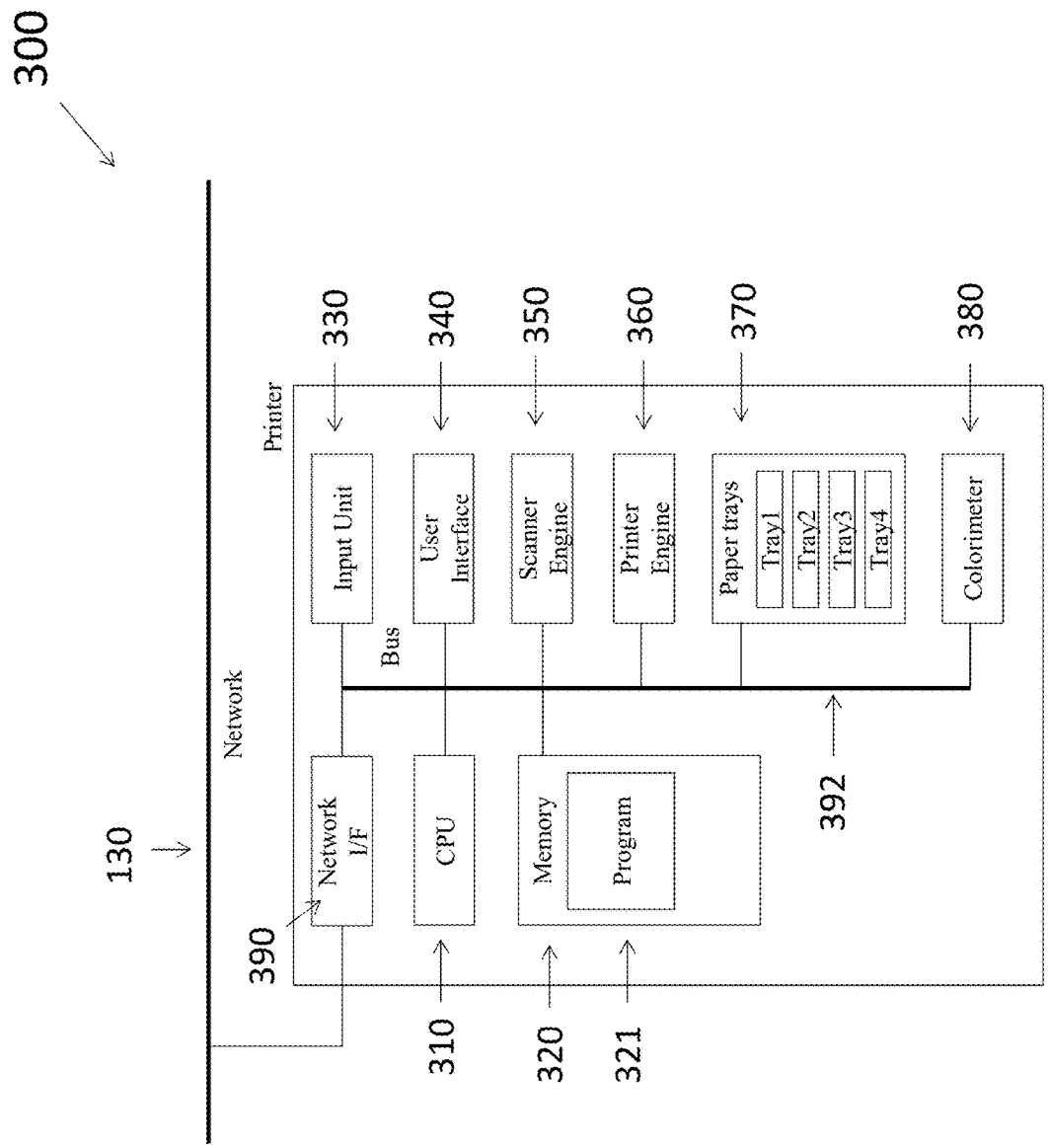
FIG. 3 is an illustration of a multifunction printer in accordance with an exemplary embodiment.

FIG. 3 is an illustration of a multifunction printer (MFP) 300 in accordance with an exemplary embodiment. As shown in FIG. 3, the multifunction printer 300 (i.e., a printer or printing device) can include a network interface (I/F) 390, which is connected to the communication network (or network) 130, a processor or central processing unit (CPU) 310, and one or more memories 320 for storing software programs, for example, firmware for the multifunction printer and data (such as files to be printed) 321. For example, the software programs 321 can include a printer controller and a tray table. The processor or CPU 310 carries out the instructions of a computer program, which operates and/or controls at least a portion of the functionality of the MFP 30. The MFP 30 can also include an input unit 330, a user interface or graphical user interface (GUI) 340 (i.e., display unit or user interface screen), a scanner engine (or scanner) 350, a printer engine 360, a plurality of paper trays 370, and a colorimeter 380. In accordance with an exemplary embodiment, the user interface 340 may include high-definition multimedia interface (HDMI), digital visual interface (DVI), video graphics array (VGA), etc. The display user interface 340 may be any suitable type of display for displaying data including a cathode ray tube (CRT) display, liquid crystal display (LCD), light-emitting diode (LED) display, capacitive touch display, thin-film transistor (TFT) display, etc.

In accordance with an exemplary embodiment, the colorimeter 380 can be an inline colorimeter (ICCU) (or spectrophotometer), which measures printed color patches in order to generate color profiles. In accordance with an exemplary embodiment, for example, the colorimeter (or spectrophotometer) 380 can be one or more color sensors or colorimeters, such as a RGB scanner, a spectral scanner with a photo detector or other such sensing device known in the art, which can be embedded in the printed paper path, and an optional finishing apparatus or device (not shown). A bus 392 can connect the various components 310, 320, 330, 340, 350, 360, 370, 380, and 390 within the multifunction printer 300. The multifunction printer 300 also includes an operating system (OS), which manages the computer hardware and provides common services for efficient execution of various software programs. In accordance with an exemplary embodiment, it can be within the scope of the disclosure for the multifunction printer 300 to be a copier.

For example, in accordance with an exemplary embodiment, an image processing section within the multifunction printer 300 can carry out various image processing under the control of a print controller or CPU 310, and sends the processed print image data to the print engine 360. The image processing section can also include a scanner section (scanner engine 350) for optically reading a document, such as an image recognition system. The scanner section receives the image from the scanner engine 350 and converts the image into a digital image. The print engine 360 forms an image on a print media (or recording sheet) based on the image data sent from the image processing section. The central processing unit (CPU) (or processor) 310 and the memory 320 can include a program for RIP processing (Raster Image Processing), which is a process for converting print data included in a print job into Raster Image data to be used in the printer or print engine 360. The CPU 310 can include a printer controller configured to process the data and job information received, for example, received via the network connection unit and/or input/output section (I/O section) 390.

The CPU 310 can also include an operating system (OS), which acts as an intermediary between the software programs and hardware components within the multifunction printer. The operating system (OS) manages the computer hardware and provides common services for efficient execution of various software applications. In accordance with an exemplary embodiment, the printer controller can process the data and job information received, for example, from a client 120 to generate a print image.

In accordance with an exemplary embodiment, the network I/F 390 performs data transfer with, for example, the one or more servers 200, 202 and/or the client device 120. The printer controller can be programmed to process data and control various other components of the multifunction printer to carry out the various methods described herein. In accordance with an exemplary embodiment, the operation of printer section commences when the printer section receives a page description from the client device 120 via the network I/F 390 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of a multifunction printer 300 consistent with exemplary embodiments of the disclosure include, but are not limited to, a multifunction printer (MFP), a laser beam printer (LBP), an LED printer, a multifunction laser beam printer including copy function.

In accordance with an exemplary embodiment, the multifunction printer 300 can also include at least one auto tray or paper tray 370, and more preferably a plurality of auto trays or paper trays. Each auto tray or paper tray 370 can include a bin or tray, which holds a stack of a print media (not shown), for example, a paper or a paper-like product. The printer engine or print engine 360 has access to a print media of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

In accordance with an exemplary embodiment, the print media is preferably a paper or paper-like media having one or more print media attributes. The print media attributes can include, for example, paper color, coating, grain direction, printing technology, brightness, CIE, tint, whiteness, labColor, etc. In order to maximize print quality, the print media attributes of each type of print media should be input into or hosted on the multifunction printer 300, for example, on printer configuration settings of the multifunction printer 300 to obtain the highest quality output. Most print media is provided in reams or other known quantities, which are packaged with indicia such as information on the manufacture, size, type and other attributes of the print media. In addition, most bundles or reams of paper include a UPC (Universal Product Code) or bar code, which identifies the type of print media including manufacture of the print media.

Figure 4:
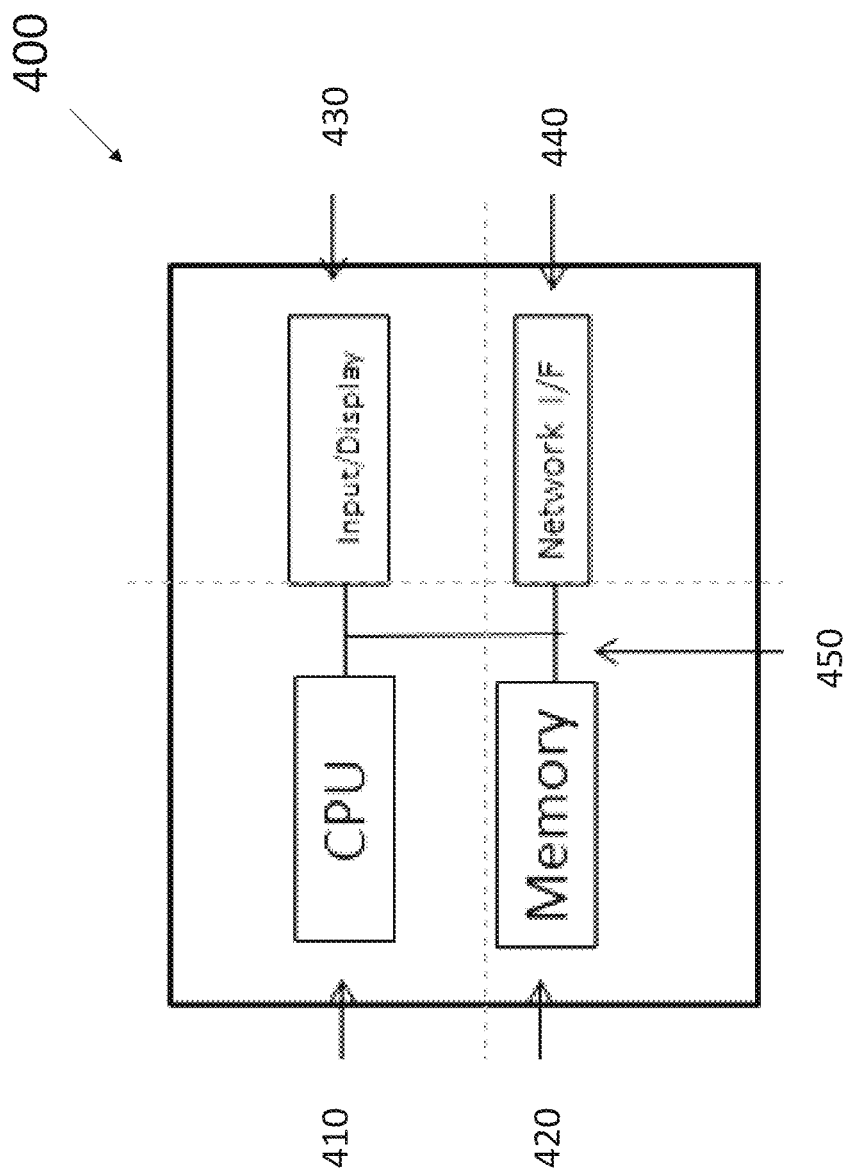
FIG. 4 is an illustration of an external biometric device in accordance with an exemplary embodiment.

FIG. 4 is an illustration of an exemplary biometric device 400 in accordance with an exemplary embodiment. In accordance with an exemplary embodiment, the exemplary biometric device 400 is a security identification and authentication device, which uses automated methods of verifying or recognizing the identity of a living person based on a physiological or behavioral characteristic. Thus, the user need not to manually input passwords to the multifunction printer 300. The method of recognizing the user can include, for example, fingerprints, electrocardiogram (ECG or EKG) information, facial images, iris, and voice recognition. For example, in accordance with an exemplary embodiment, the biometric device 400 can be an external biometric device 400 that includes an interface, for example, an input/display 430 configured to detect a fingerprint of a user 110. Alternatively, the biometric device 400 can be wearable device, for example, a Nymi™ band, which detection of the user is based on the electrocardiogram (ECG) and its unique properties, i.e., electrical activity of the heartbeat of the wearer.

As shown in FIG. 4, the biometric device 400 can include a processor or central processing unit (CPU) 410, and one or more memories 420 for storing software programs and data, for example, an operating system. In accordance with an exemplary embodiment, the processor or CPU 410 carries out the instructions of a computer program, which operates and/or controls at least a portion of the functionality of the biometric device 400. The biometric device 400 can also include the input unit and/or display unit or graphical user interface (GUI) 430, and a network interface (I/F) 440, which is configured to connect the biometric device 400 to the MFP 300 via, for example, a wire or wireless technology, for example, Bluetooth. A bus 450 can connect the various components 410, 420, 430, 440, within the biometric device 400.

In accordance with an exemplary embodiment, the biometric device 400 of the user 110 may communicate with the client 120, for example, a mobile client, tablet, or personal computer, when Bluetooth or Near Field Communication (NFC) or other protocols are available to transfer and/or receive the biometric data, access codes and/or temporary codes as disclosed herein. For example, the client 120 may include a display unit or graphical user interface, which can access, for example, a web browser in the memory of the mobile client (or mobile device). The mobile client (or mobile device) also includes the operating system (OS), which manages the computer hardware and provides common services for efficient execution of various software programs.

Security Assertion Markup Language (SAML) is an XML standard for exchanging single sign-on (SSO) information between an SAML Federation Identity Provider (SAML-IdP) who asserts the user identity and a SAML Federation Service Provider (SAML-SP) who consumes the user identity information. SAMLv2.0 (Security Assertion Markup Language version 2) supports IDP-initiated and SP-initiated flows. In IdP-initiated SAML SSO flow, the SAML-IdP creates a SAML single sign-on assertion for the user identity, and sends the SAML single sign-on assertion to the SP (Service Provider) in an unsolicited fashion. In SP-Initiated SAML SSO flow, the SP generates a SAML2.0 AuthnRequest (e.g., Authentication Request), which is sent to the SAML-IdP as the first step in the Federation process and the SAML-IdP then responds with a SAML Response, both of these interactions being asynchronous to each other In accordance with an exemplary embodiment, the SAML-IdP is a system entity that issues authentication assertions in conjunction with a single sign-on (SSO) profile of the Security Assertion Markup Language (SAML). In the SAML domain model, a SAML authority is any system entity that issues SAML assertions. Two important examples of SAML authorities are the authentication authority and the attribute authority.

In accordance with an exemplary embodiment, the SAML-SP server 200 can be configured to receive and accept authentication assertions in conjunction with a single sign-on (SSO) profile of the Security Assertion Markup Language. In the SAML domain model, the SAML-SP server 200 (e.g., SAML relying party) is any system entity that receives and accepts information form another system entity. Of particular interest is a SAML relying party that receives and accepts a SAML assertion issued by a SAML authority. An important type of SAML authority is the SAML Identity Provider (IdP), a system entity that issues authentication assertions in conjunction with an SSO profile of SAML. A relying party that consumes such assertions is called a SAML service provider (or simply service provider if the domain is understood). Thus, a SAML service provider (SAML-SP) is a system entity that receives and accepts an authentication assertion issued by a SAML Identity Provider (SAML-IdP).

Figure 5:
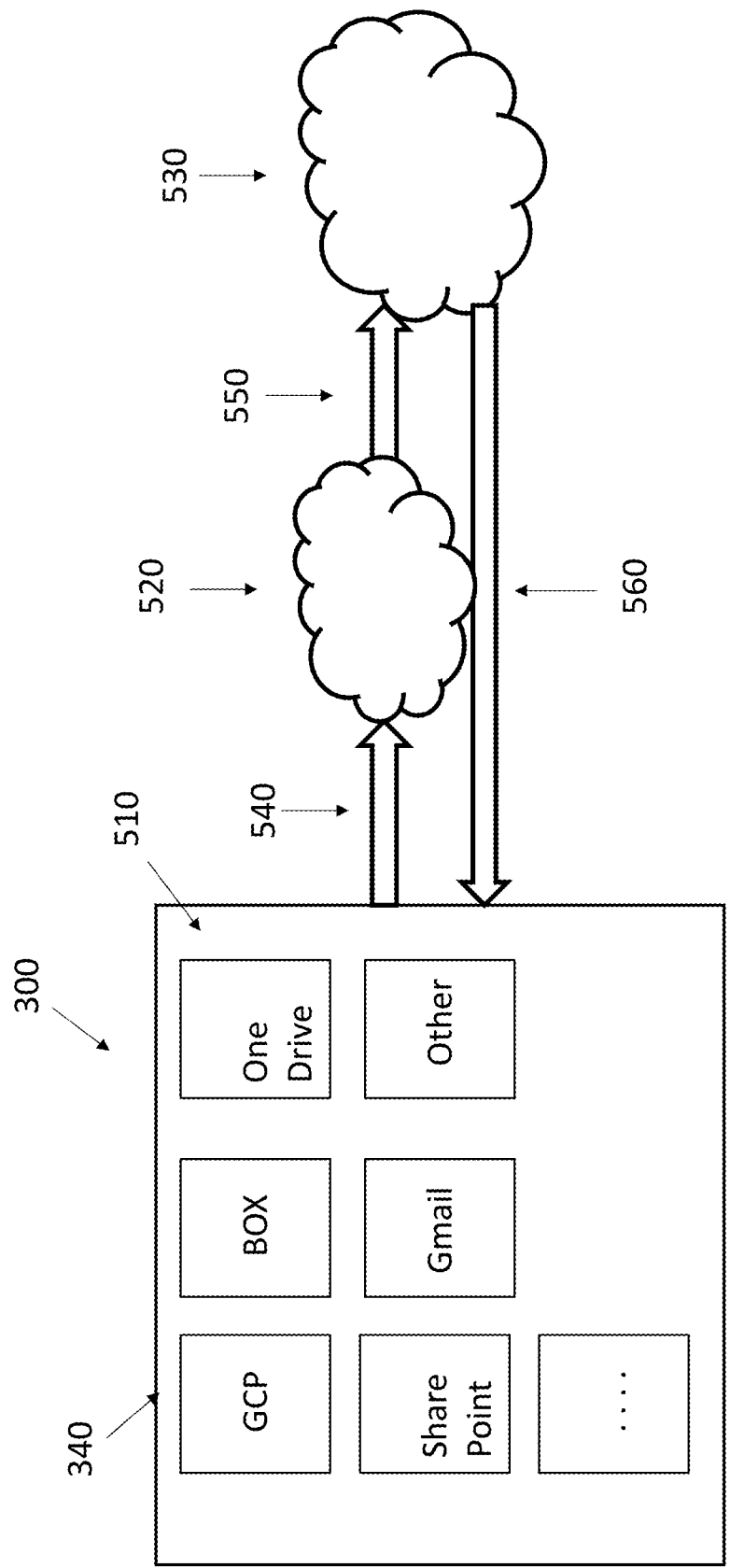
FIG. 5 is an illustration of a workflow in accordance with one embodiment.

FIG. 5 is an illustration of a workflow 500 in accordance with one embodiment. As shown in FIG. 5, an administrator, for example, on behalf of an enterprise can purchase a plurality of cloud ready applications 510, which are placed onto one or more multi-function printer (MFPs) 300. In accordance with one embodiment, a cloud ready application can be, for example, a legacy software program that has been modified to run on a cloud computing infrastructure (e.g, an application that previously ran on an enterprise's on-site server that is now running in an off-site data center and accessed by the enterprise through the internet). For example, the cloud ready applications 510 can be available through a MFP vendor's market place (for example, cloud SaaS) 520 which will manage payments and subscriptions etc. In addition, the cloud ready applications 510 can reside inside the MFP vendor's private cloud 530, which can be downloaded into the one or more MFPs 300.

As shown in FIG. 5, the MFP 300 can include a user interface or graphical user interface (GUI) 340, which can display one or more cloud ready applications 510. The cloud ready applications 510 can include, for example, Google Cloud Print (GCP), SharePoint, OneDrive, Box, and Gmail. For example, the cloud ready applications 510 can be purchased 540 from the MFP vendor's market place 520 by an administrator. Once the cloud ready applications 510 are purchased by the administrator, the cloud ready applications 510 can be uploaded 550 to the MFP vendor's private cloud 530. The cloud ready applications 510 can then be installed or downloaded 560 on the MFP 300. In accordance with an exemplary embodiment, the cloud ready application can be sandboxed purpose-built native applications that have been installed on the user interface 340 (i.e., panel) of a MFP 300.

Figure 6:
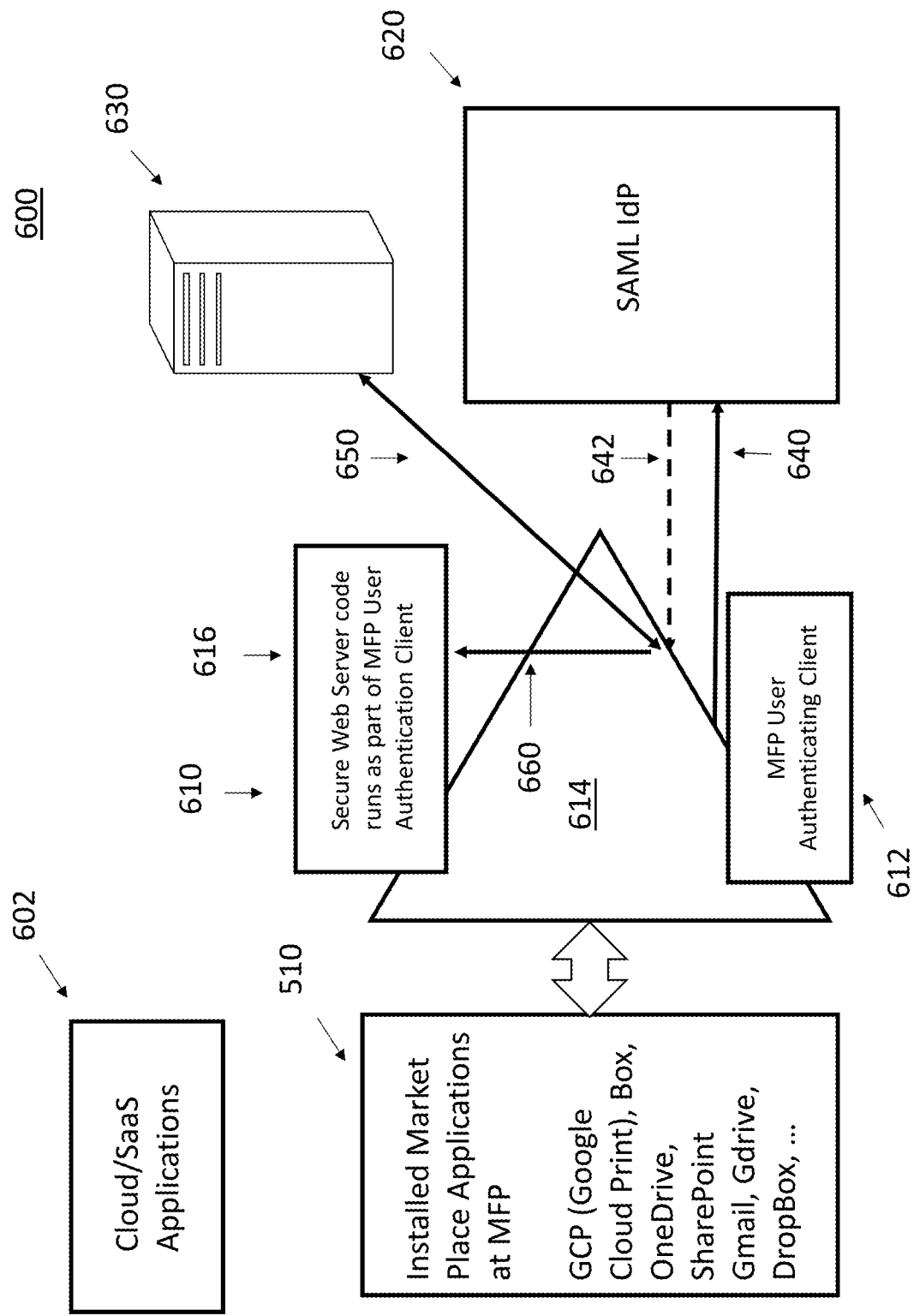
FIG. 6 is an illustration of a user authentication workflow in accordance with an embodiment in which each user is authenticated, for example, using a secure MFP.

FIG. 6 is an illustration of a user authentication workflow 600 in accordance with an embodiment in which each user 110 is authenticated (for example, using a secure MFP 300). In accordance with an embodiment, a multifunction printer SPS-client module (MFP SPS-client module) 610 can include a MFP user authentication client software 612, a secure web server 614, which can run secure web server code 616 as part of the MFP user authentication client software 612. In accordance with an embodiment, the secure web server 614 can be responsible for providing single sign-on (SSO) in a relatively seamless fashion. For example, the secure web server 610 can be run on Linux platform, for example, in C++ library. In accordance with an embodiment, the MFP user authentication client software 612 and the secure web server 614 can be two different independent components. However, in accordance with an embodiment, as set forth above, the MFP user authentication client software 612 and the secure web server 610 can be part of the MFP SPS-client module 610. In accordance with an embodiment, the secure web server 614 can be associated with the MFP 300 and the secure web server 614 provides for pre-authentication purposes between the user 110 (e.g., a MFP 300) and an authentication server 620 (for example, an SAML-IdP server 620). In accordance with an embodiment, the user 110 is pre-authenticated before the user 110 can avail (or access) any services from, for example, installed market place applications 510 (i.e., cloud services).

As shown in FIG. 6, the workflow 600 can include a cloud provider 602 (for example, Cloud/SaaS application), which can be accessed via the installed market place applications 510 on the MFP 300. The authenticating of a user 110 can be performed using the secure web server 614, which is associated with the MFP 300. In accordance with an embodiment, secure web server code can be run as part of the MFP user authenticating client 612. In accordance with an embodiment, in step 640, the MFP user authentication client software 612 can receive the login information of the user 110, for example, via a single sign-on (SSO) method (or protocol), for example, via biometrics, such as finger print, facial identification or facial recognition, iris detection from a biometric device 400, and/or username and PIN (personal identification number). The login information is transmitted by the MFP user authenticating client 612 using the secure web server 614 to the authentication server 620, for example, the SAML IdP server for authentication. The SAML IdP server, for example, will authenticate the login information received from the MFP user authenticating client 612. In step 642, upon the authentication of the user 110, the SAML IdP server 620 can provide the MFP user authenticating client 612 via the secure web server 614 with a JSON Web Token (JWT) on behalf of the user 110.

In accordance with an embodiment, upon authentication of the user 110, in step 650, a request can be sent by the MFP user authentication client software 612 to the DNS server 630 for a list of IP addresses and associated hostnames for the installed market place applications hosted on the MFP 300 in which the user 110 is authorized to access. In response to the request, the DNS server 630 responds with a list of IP addresses and associated hostnames for the installed market place applications hosted on the MFP 300 in which the user 110 is authorized to access. In step 660, the MFP user authenticating client 612 can post the JSON web token (JWT) into a User JWT secure container 616.

Figure 7:
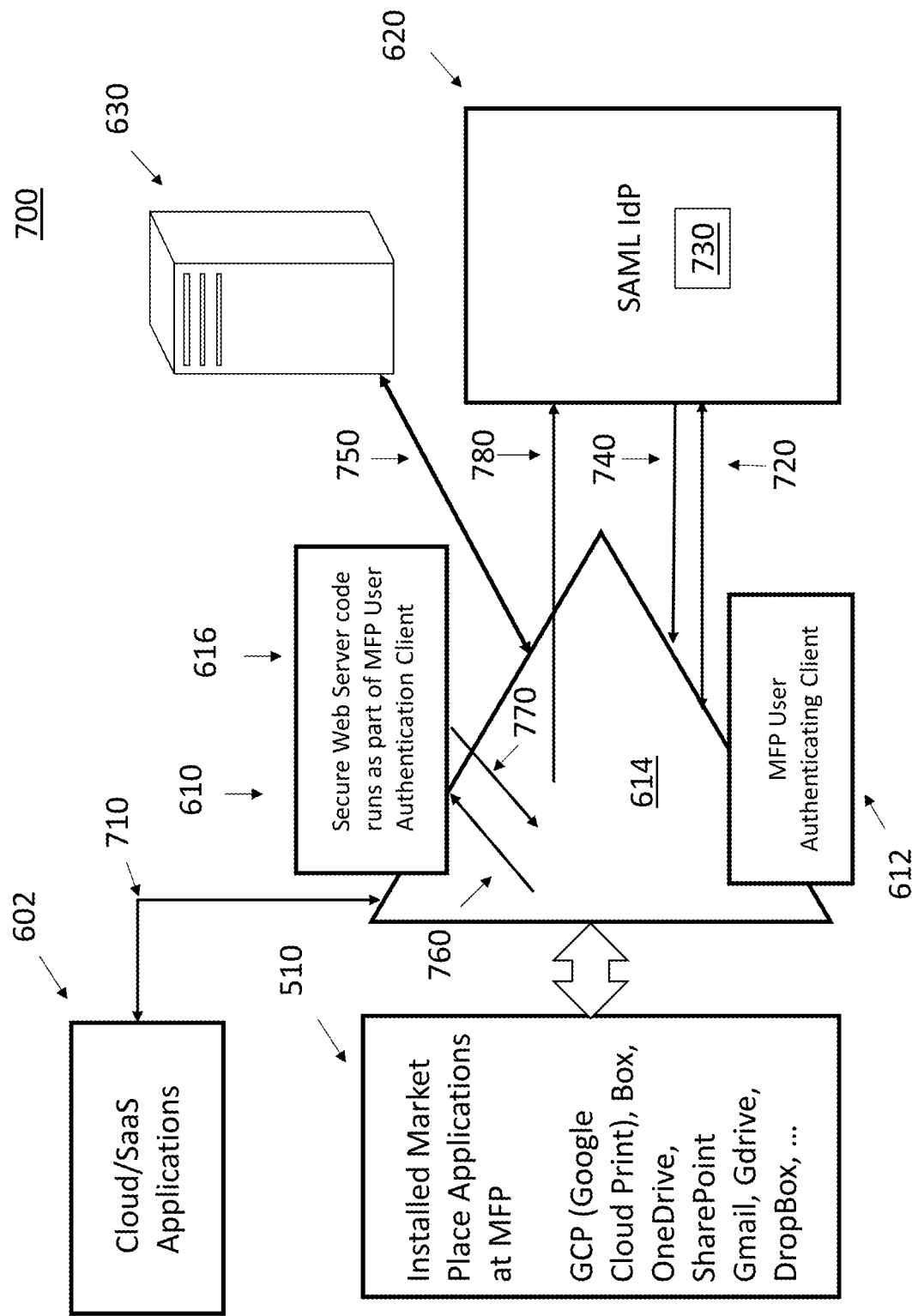
FIG. 7 is an illustration of a workflow, in which a secure web server running inside the MFP user authenticating client can facilitate in supplying the JSON web token (JWT) of a user to a main HTTP redirectional flow, that was contained when the user was authenticated.

FIG. 7 is an illustration of a workflow 700, in which a secure web server 614 running inside (part of same client software) the MFP user authenticating client 612 can facilitate in supplying the JSON web token (JWT) of a user 110 to a main HTTP redirectional flow, that was contained when the user 110 was authenticated. In accordance with an embodiment, the user 110 can access the market place applications with the authenticating server 620, for example, the SAML IdP server with the secure web server 614 running on the MFP user authenticating client 612. However, in accordance with an embodiment, the authenticated user 110 does not notice anything other being able to access the resources or services on the cloud server 602. Thus, the workflow as shown in FIG. 7 provides a totally seamless password-less experience for the end user as the authentication server 620, for example, the SAML IdP server and the MFP user authenticating client 612 are involved in silent swing fashion in satisfying the authentication requirement that is needed to be fullfilled before SAML responses can be sent to the corresponding cloud provider 602. In accordance with an embodiment, the SAML IdP server (or authentication server) 620 can leverage HTTP redirection as the SAML IdP server 620 handles the original SAML authentication request (by cloud provider SAML-SP) through market place applications on the MFP 300. In addition, the MFP user authenticating client 612 that has the secure web server 614 running, will answer that extra redirection from the SAML IdP server 620 (authentication server) by providing the JWT of the user 110 such that the process is both secure and seamless.

As shown in FIG. 7, the process start in step 710, in which a request for a resource or service is sent from the MFP 300 via a selection of one of the installed market place applications 510 to the cloud server 602. In response to the request for the resource or service received by the cloud server 602, the multifunction printer (MFP) 300 will receive a redirection request from the cloud server 602 to initiate the authentication of the user 110. In step 720, the secure web server 614 will initiate the SAML flow with the authentication server 620. In step 730, the authentication server 620 will identify and authenticate the user 110 based on the previous pre-authentication. In step 740, the authentication server 620, for example, the SAML IdP server can generate a GET request (e.g., mobilesso.kmauthgid.com) for the JSON web token (JWT) of the pre-authenticated user 110. In step 750, an optional request can be sent to the DNS server 630 receive the IP address and hostname of the resource or service requested (e.g., DNS resolve), if the IP address and host name has not been cached on the MFP 300. In step 760, a request is sent to the User JWT secure container 616 for the JSON web token (JWT) of the pre-authenticated user 110. In step 770, the JSON web token is received from the User JWT secure container 616, and is sent in step 780 to the authentication server 620 to generate the SAML assertion, which is sent to the secure web server 614 on the MFP 300. Once the secure web server 614 on the MFP receives the SAML assertion, the secure web server can send the SAML assertion to the cloud server 602 so that the pre-authenticated user 100 on the MFP 300 can request and receive the resource or service hosted on the cloud server 602.

Figure 8:
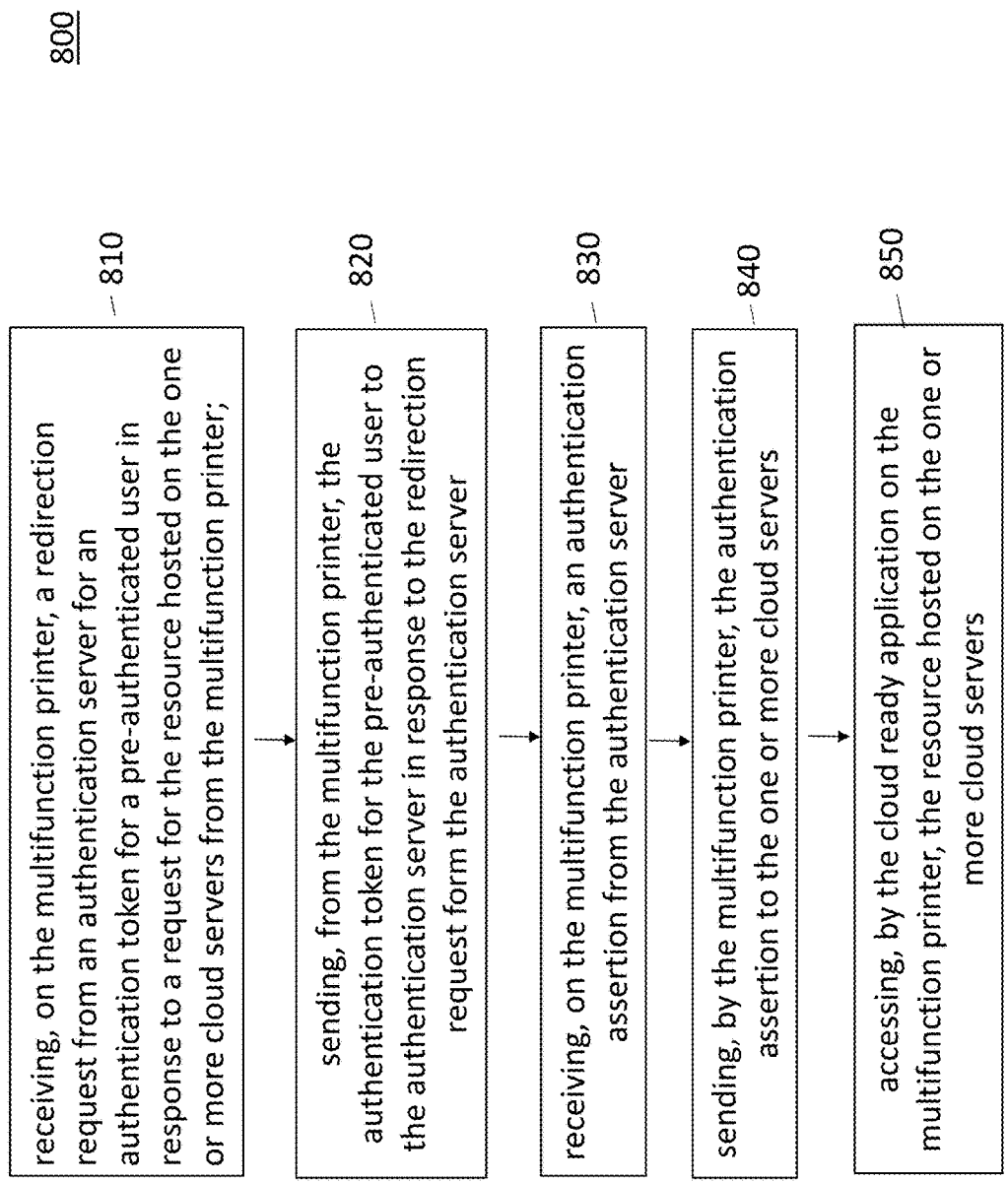
FIG. 8 is a flowchart illustrating a method for accessing a resource hosted on one or more cloud servers from a cloud ready application on a multifunction printer in an one embodiment.

FIG. 8 is a flowchart illustrating a method for accessing a resource hosted on one or more cloud servers from a cloud ready application on a multifunction printer in an one embodiment. As shown in FIG. 8, in step 810, a redirection request is received on the multifunction printer from an authentication server for an authentication token for a pre-authenticated user in response to a request for the resource hosted on the one or more cloud servers from the multifunction printer. In step 820, the authentication token for the pre-authenticated user is sent from the multifunction printer to the authentication server in response to the redirection request form the authentication server. In step 830, an authentication assertion is received on the multifunction printer from the authentication server. In step 840, the authentication assertion is sent by the multifunction printer to the one or more cloud servers. In step 850, the resource hosted on the one or more cloud servers is accessed by a cloud ready application on the multifunction printer.

In accordance with another embodiment, the pre-authenticated user is authenticated on the multifunction printer via a single sign-on (SSO) method. In addition, the authentication server can be a Security Assertion Markup Language (SAML) Identity Provider, and the one or more cloud servers can be a SAML Service Provider.

In accordance with a further embodiment, the authentication token is a JSON Web Token (JWT). In addition, one or more cloud ready applications can be hosted on the multifunction printer, the one or more cloud ready applications being connected to a corresponding application hosted on the one or more cloud servers. For example, the one or more cloud ready applications hosted on the multifunction printer can be sandboxed purpose-built native applications that have been installed on the user interface of the multifunction printer from a private cloud of a multifunction printer vendor.

In accordance with one embodiment, a secure web server can be hosted on the multifunction printer. The secure web server being configured to communicate with the authentication server and the one or more cloud servers. In accordance with an embodiment, the redirection request from the authentication server can be configured to operate concurrently with requests for resources hosted on the one or more cloud servers via the secure web browser on the multifunction printer. In addition, the authentication token can be secured on the multifunction printer in a secure container. In accordance with an embodiment, the secure web server can be concurrently running on the multifunction printer with a user authenticating client, the user authenticating client configured to authenticate users on the multifunction printer via a Security Assertion Markup Language (SAML) based single sign-on (SSO) protocol. The SAML based SSO protocol can include a biometric login. In addition, secure web server code of the secure web server can be run as part of the user authenticating client on the multifunction printer.

In accordance with an embodiment, the resource hosted on the one or more cloud servers can be accessed on the multifunction printer from the multifunction printer via a graphical user interface of the multifunction printer. In addition, once the pre-authenticated user has been granted access to the resource hosted on the one or more cloud servers, no further login is required.

In accordance with an embodiment, the MFP user authenticating client 612 can include a software component, that continuously awaits for redirection request from the authentication provider (for example, the SAML-IdP Server 620) and submits the JSON Web Token (JWT) corresponding to the pre-authenticated user (i.e., uniquely identifies a user) via response to a processed redirection request. In accordance with an exemplary embodiment, the redirection from SAML-IdP server 620 to the MFP user authenticating client 612 running on the corresponding MFP 300 can be in addition to a regular SAML flow. In accordance with an exemplary embodiment, for example, the additional redirection visit to the installed market place application applications 510 on the MFP 300 can steal the original flow (e.g., the flow started by login process on the MFP 300 by the user 110) so that the context is not lost. In accordance with an exemplary embodiment, the goal of the flow can be to avoid prompting the authenticated user for authentication details, as the flow starts from the MFP 300, which does not have any context on a pre-authenticated user.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for accessing a resource hosted on one or more cloud servers from a cloud ready application on a multifunction printer, the method comprising:
   hosting, on the multifunction printer, a processor and a secure web server, the processor configured to carry out the instructions of a computer program, which operates and/or controls at least a portion of a functionality of the multifunction printer, the secure web server being part of client software of a user authenticating client of the multifunction printer and configured to communicate with an authentication server and the one or more cloud servers;
   running, on the multifunction printer, the secure web server concurrently with a user authenticating client, the user authenticating client configured to authenticate a pre-authenticated user on the multifunction printer;
   receiving, on the secure web server of the multifunction printer, a redirection request from the authentication server for an authentication token for the pre-authenticated user in response to a request for the resource hosted on the one or more cloud servers from the multifunction printer;
   sending, from the secure web server of the multifunction printer, the authentication token for the pre-authenticated user to the authentication server in response to the redirection request form the authentication server;
   receiving, on the secure web server of the multifunction printer, an authentication assertion from the authentication server;
   sending, by the secure web server of the multifunction printer, the authentication assertion to the one or more cloud servers; and
   accessing, by the secure web server of the multifunction printer, the resource hosted on the one or more cloud servers.

2. The method according to claim 1, further comprising:
   authenticating the pre-authenticated user on the multifunction printer via a single sign-on (SSO) method.

3. The method according to claim 1, wherein the authentication server is a Security Assertion Markup Language (SAML) Identity Provider, and the one or more cloud servers is a SAML Service Provider.

4. The method according to claim 1, wherein the authentication token is a JSON Web Token (JWT).

5. The method according to claim 1, further comprising:
   hosting, on the multifunction printer, one or more cloud ready applications, the one or more cloud ready applications being connected to a corresponding application hosted on the one or more cloud servers.

6. The method according to claim 5, further comprising:
   hosting, on the multifunction printer, the one or more cloud ready applications being sandboxed purpose-built native applications that have been installed on the user interface of the multifunction printer from a private cloud of a multifunction printer vendor.

7. The method according to claim 1, wherein the redirection request from the authentication server is configured to operate concurrently with requests for resources hosted on the one or more cloud servers via the secure web server on the multifunction printer.

8. The method according to claim 1, further comprising:
   securing, on the multifunction printer, the authentication token in a secure container.

9. The method according to claim 1, further comprising:
   authenticating the pre-authorized user on the multifunction printer via a Security Assertion Markup Language (SAML) based single sign-on (SSO) protocol.

10. The method according to claim 9, wherein the SAML based SSO protocol includes a biometric login.

11. The method according to claim 9, further comprising:
    running, as part of the user authenticating client on the multifunction printer, secure web server code of the secure web server.

12. The method according to claim 1, further comprising:
    accessing, on the multifunction printer, the resource hosted on the one or more cloud servers from the multifunction printer via a graphical user interface of the multifunction printer.

13. The method according to claim 1, wherein once the pre-authenticated user has been granted access to the resource hosted on the one or more cloud servers, no further login is required.

14. A non-transitory computer readable medium (CRM) storing computer program code executed by a multifunction printer that performs a process for accessing a resource hosted on one or more cloud servers from a cloud ready application on the multifunction printer, the process comprising:
- hosting, on the multifunction printer, a processor and a secure web server, the processor configured to carry out the instructions of a computer program, which operates and/or controls at least a portion of a functionality of the multifunction printer, the secure web server being part of client software of a user authenticating client of the multifunction printer and configured to communicate with an authentication server and the one or more cloud servers;
- running, on the multifunction printer, the secure web server concurrently with a user authenticating client, the user authenticating client configured to authenticate a pre-authenticated user on the multifunction printer;
- receiving, on the secure web server of the multifunction printer, a redirection request from the authentication server for an authentication token for the pre-authenticated user in response to a request for the resource hosted on the one or more cloud servers from the multifunction printer;
- sending, from the secure web server of the multifunction printer, the authentication token for the pre-authenticated user to the authentication server in response to the redirection request form the authentication server;
- receiving, on the secure web server of the multifunction printer, an authentication assertion from the authentication server;
- sending, by the secure web server of the multifunction printer, the authentication assertion to the one or more cloud servers; and
- accessing, by the secure web server of the multifunction printer, the resource hosted on the one or more cloud servers.

15. The non-transitory computer readable medium according to claim 14, further comprising:
- authenticating the pre-authenticated user on the multifunction printer via a single sign-on (SSO) method.

16. The non-transitory computer readable medium according to claim 14, wherein the authentication server is a Security Assertion Markup Language (SAML) Identity Provider, the one or more cloud servers is a SAML Service Provider, and the authentication token is a JSON Web Token (JWT).

17. The non-transitory computer readable medium according to claim 14, further comprising:
- hosting, on the multifunction printer, one or more cloud ready applications, the one or more cloud ready applications being connected to a corresponding application hosted on the one or more cloud servers; and
- hosting, on the multifunction printer, the one or more cloud ready applications being sandboxed purpose-built native applications that have been installed on the user interface of the multifunction printer from a private cloud of a multifunction printer vendor.

18. The non-transitory computer readable medium according to claim 14, wherein the redirection request from the authentication server is configured to operate concurrently with requests for resources hosted on the one or more cloud servers via the secure web browser on the multifunction printer.

19. A multifunction printer for accessing a resource hosted on one or more cloud servers from a cloud ready application on the multifunction printer, the multifunction printer comprising:
- a memory;
- a graphical user interface; and
- a processor, the processor configured to:
  - carry out the instructions of a computer program, which operates and/or controls at least a portion of a functionality of the multifunction printer:
- a secure web server, which is part of client software of a user authenticating client of the multifunction printer, the secure web server configured to:
  - receive, a redirection request from an authentication server for an authentication token for a pre-authenticated user in response to a request for the resource hosted on the one or more cloud servers from the multifunction printer, the pre-authenticated user being authenticated via a single sign-on (SSO) method;
  - send the authentication token for the pre-authenticated user to the authentication server in response to the redirection request form the authentication server;
  - receive an authentication assertion from the authentication server;
  - send the authentication assertion to the one or more cloud servers; and
  - access the resource hosted on the one or more cloud servers.

* * * * *